July 17, 1962

J. P. NICOSIA ET AL 3,044,791

CLAMP CHUCK FOR WORKPIECES

Filed May 16, 1961

INVENTORS.
Joseph P. Nicosia.
Richard Newhouser.

BY Wm. R. Glisson
ATTORNEY

July 17, 1962     J. P. NICOSIA ET AL     3,044,791
CLAMP CHUCK FOR WORKPIECES

Filed May 16, 1961     2 Sheets-Sheet 2

INVENTORS
Joseph P. Nicosia
Richard Newhouser
BY Wm. R. Glisson
ATTORNEY

– Patented July 17, 1962

3,044,791
CLAMP CHUCK FOR WORKPIECES
Joseph P. Nicosia and Richard Newhouser, Detroit, Mich., assignors to The Budd Company, Philadelphia, Pa., a corporation of Pennsylvania
Filed May 16, 1961, Ser. No. 110,504
4 Claims. (Cl. 279—106)

This invention relates to a clamp chuck for workpieces such as flanged wheel hubs and has for an object the provision of improvement in this art.

After a flanged wheel hub has been blanked in forming dies and the flange seating surfaces have been accurately finished it is necessary to machine the bore at both ends and to drill the holes in the flange which take the staked bolts which secure wheel disk and brake drum to the hub flange. Such a flanged hub, although with a differently shaped bore than that shown herein—a rear instead of a front—and a method of forming it are disclosed in the patent to Greenshields et al. No. 2,972,183, Feb. 21, 1961.

The bore turning and hole drilling operations can conveniently be performed in a turret type machine in which the flange is accurately seated and clamped. A bullard type "L" machine is one example of such a machine. Such a machine provides a plurality of radially slidable chuck jaws which move in together to grip the outer edge of the flange.

The outer edge of the flange is not regular in shape adn is not intended to be since it does not fit with any other part in use. This being the case, there is no need to go to the expense of machining the edge merely for accurate chucking for machining. Yet if the edge is irregular the hub will not be accurately positioned by the usual radially moving chuck members and the bores will not be properly oriented and trued with reference to the finished flange faces.

It is therefore an object of the present invention to provide means for securely holding the hub blank or workpiece in proper position regardless of the irregularities of the outer edge of the flange.

But even if the outer edge of the flange should be circular and properly concentric with the axis of the hub, the radially moving gripping jaws might allow it to tilt when the side pressure of the turning tool is exerted in turning the hub bore. Accordingly, it is another object of the invention to provide clamping means which exert axial pressure down on the hub flange to keep it firmly seated on the positioning surface of the turret machine.

A specific object is to provide a shiftable clamp jaw actuating plate which will insure that all of the clamping jaws around the periphery of the flange grip it with equal pressure.

The above and other objects and advantages of the invention will be apparent from the following description of an exemplary embodiment, reference being made to the accompanying drawings, wherein.

Figure 2:
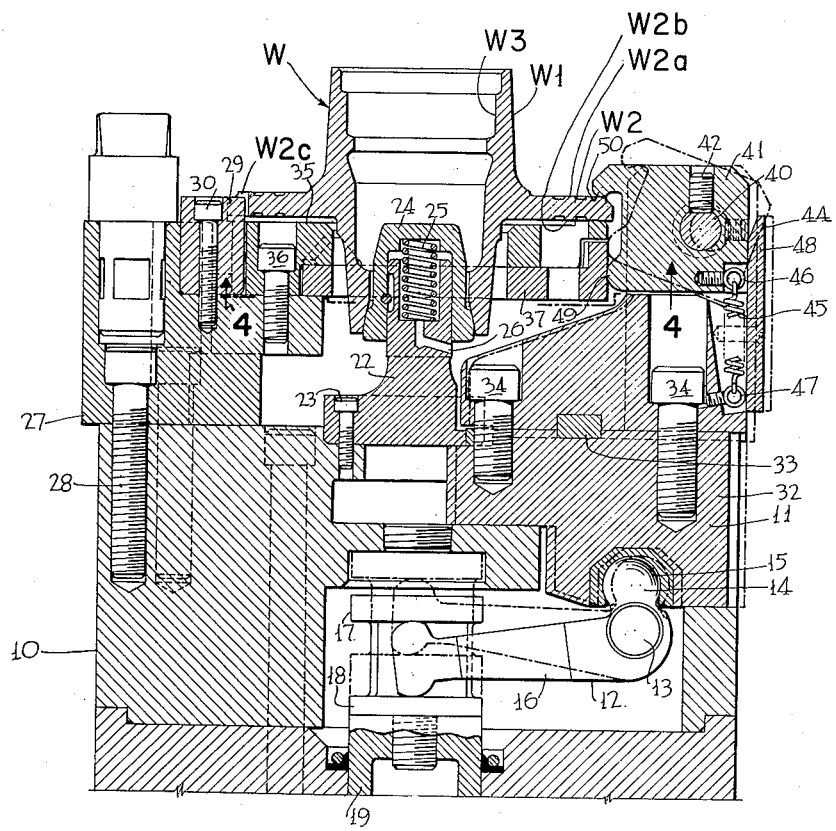
FIG. 2 is a vertical or axial section taken on the line 2—2 of FIG. 1, a workpiece being shown clamped in position.
Figure 3:
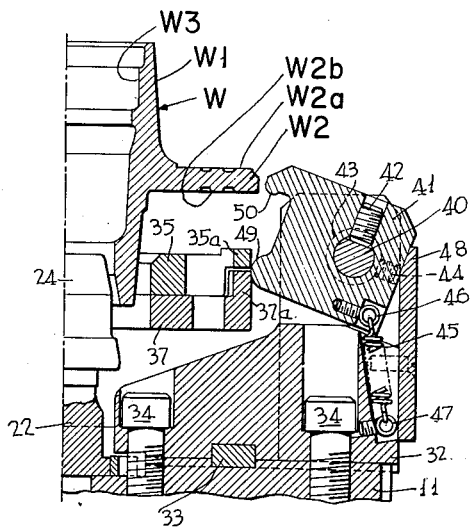
FIG. 3 is a section like the right portion of FIG. 2 but showing the workpiece being inserted in the machine.

As shown in FIGS. 2 and 3, the workpiece to be machined is here shown to be a wheel hub W having a hub proper W1 and an integral flange W2. The hub has a bore W3 which requires machining at each end. It will here be assumed that the lower end has already been machined and that the central axis of the hub is exactly true (at right angles) with the coined finished surfaces W2a and W2b of the flange. Holes are also to be drilled through the flange W2 while the hub is gripped on the turret head.

The rotatable head assembly is orbitable on the turret machine but it is not necessary to show the whole machine. The head comprises a base 10 carrying a plurality (here three) of guided radially movable slides 11 which are moved in and out by bell crank levers 12 which are carried by fixed axes 13, have rounded ends of short arms 14 operating in sockets 15 of the slides, and have rounded ends of long arms 16 operating between flanges 17 and 18 of an axially movable slide operating plunger 19.

A pedestal 22 is centrally secured, as by cap bolts 23, to the base 10 and carries an axially slidable cap 24 which seats in the finished bore at the lower end of the hub to accurately center the hub on the axis of the head. The cap is pushed up by a spring 25 and a relief duct 26 provides for escape of air from within the cap.

Upper head elements 27 are held on the base 10 by cap bolts 28. At one point around its periphery the hub flange W2 is provided with a drive notch W2c and the head is provided with a drive detent 29 fitting in the notch W2c, the detent being held on the element 27 by a cap bolt 30.

Each slide 11 carries a jaw holding support 32 held in position thereon by a key 33 and cap bolts 34. A flange supporting member 35 is held in fixed position on the head by cap bolts 36. There are three flange support elements 35a on the member 35.

Figure 1:
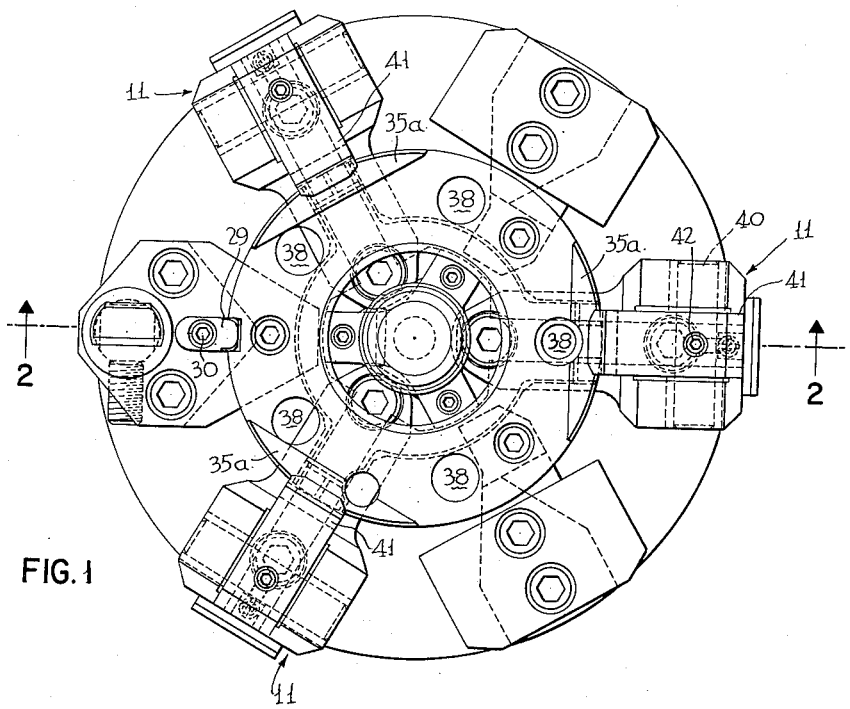
FIG. 1 is a top plan view of one rotary head of a turret machine, the head being shown as provided with the clamping means of the present invention and no workpiece being present in the machine.
Figure 4:
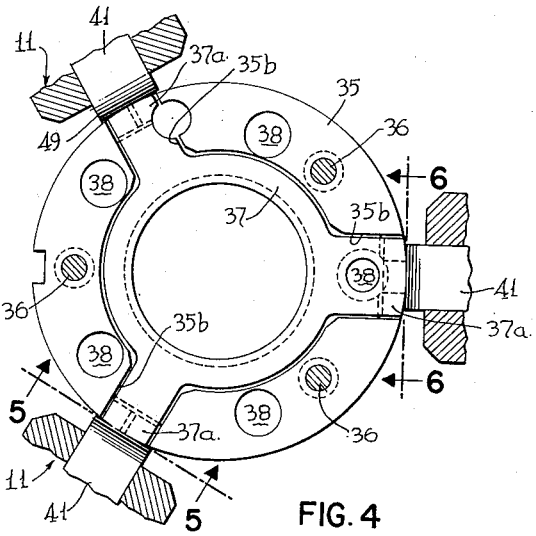
FIG. 4 is an inverted partial plan view and section taken on the line 4—4 of FIG. 2.
Figure 5:
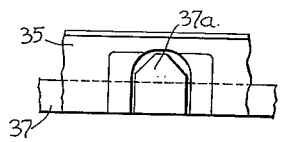
FIG. 5 is an elevation of a detail taken on the line 5—5 of FIG. 4.
Figure 6:
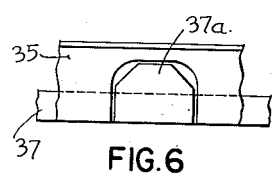
FIG. 6 is a view like FIG. 5 but taken on the line 6—6 of FIG. 4.

Beneath the flange supporting member 35 there is mounted for limited lateral or transverse movement a floating ring 37 having projections 37a extending out through oversize radial slots 35b in the member 35. The outer ends of these projections 37a are adapted to be engaged by flange clamping jaws, as will be explained. The member 35 and the floating ring 37 (actually the ring projections 37a) are provided with holes 38 to clear the drills which make the stake bolt holes in the hub flange. FIG. 4 shows the floating plate and FIGS. 5 and 6 show the projections in end elevation, FIG. 6 showing how the projection which has a full hole in its is made wider to compensate.

On each slide jaw support 33 there is mounted on a journal 40 a hinged gripping jaw 41, the journal pin being made fast in the jaw by a set screw 42. Bushings 43 for the ends of the journal pin are held in position by set screws 44. The jaw is urged toward open position by a spring 45 connected to eye screws 46 and 47 at its ends. The outer position of the jaw is limited by a stop 48.

The jaw is provided with a lower projection or positioning lug 49 which engages the outer end of a floating ring projection 37a and an upper projection or clamp finger 50 which engages the upper surface of the workpiece at the outer edge. Both of the projections 49 and 50 are rounded on the end.

In operation, when the slides are in outer position the jaws are open at the upper end and a workpiece can be fed in or out.

When the slides are moved inward the lower projections of the jaws engage the projections of the floating ring and cause the upper projections of the jaws to swing inward and downward on the upper outer edge of the hub flange. The floating ring or plate can move around as required to equalize the clamping action of the jaws.

It is thus seen that the invention provides simple and improved clamping means which will equalize the clamping action of the jaws and securely hold the workpiece down against all tilting movement whereby the bore and holes will be properly located and the bore and holes trued up with the finished coined surfaces of the hub flange.

While one embodiment of the invention has been described for purposes of illustration it is to be understood that there may be various embodiments and modifications within the general scope of the invention.

What is claimed is:

1. Clamp chuck mechanism for a workpiece having a hub and a flange, comprising in combination, a rotary head, a plurality of radially movable clamp jaw slides mounted on said head, a gripper jaw pivoted on said slide, said gripper jaw having an upper projection adapted to grip the flange of a workpiece and a lower projection adapted to engage an element which causes the jaw to swing inward at the upper projection when the slide is moved inward, a support for the flange of the workpiece between said jaw projections, and a floating ring disposed between the lower projections of said jaws for producing equalized gripping action by the upper projections of said jaws.

2. Clamp chuck mechanism for a workpiece having a hub, a center bore in the hub and a flange, comprising in combination, a rotary head, a support for the flange of the workpiece on said head, a centering element fitting in the lower end of the hub bore, a laterally floating jaw operating ring mounted beneath said flange support and having radial jaw operating projections extending through oversize slots in said flange support, a plurality of radially movable jaw slides mounted on said head, pivoted clamp jaws mounted on said slides, said clamp jaws having upper projections engageable with the top and outer edge of a flange and a lower projection engageable with a ring projection to swing the upper projection inward when the slide is moved inward.

3. Clamp chuck mechanism as set forth in claim 2, which further includes in combination, means biasing said jaws outward at the upper end when the slides move outward to provide for passage of a workpiece into and out of operating position.

4. Clamp chuck mechanism as set forth in claim 2, wherein said jaws are pivoted at a point above the flange support to cause the upper jaw projections to swing downward and inward on the flange to clamping position.

References Cited in the file of this patent

UNITED STATES PATENTS

| | | |
|---|---|---|
| 1,783,420 | Garno | Dec. 2, 1930 |
| 2,613,943 | Trudeau | Oct. 14, 1952 |
| 2,699,084 | Ovshinsky | Jan. 11, 1955 |
| 2,865,643 | Parker | Dec. 13, 1958 |